March 6, 1934.  J. W. SHERA  1,949,979
CONTAINER AND SEALING MEANS THEREFOR
Filed Aug. 10, 1931
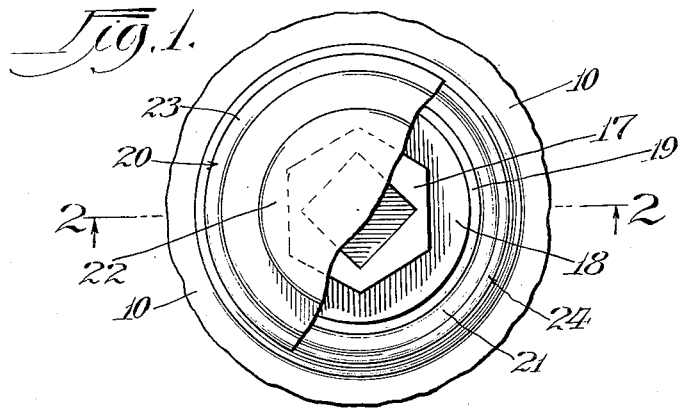
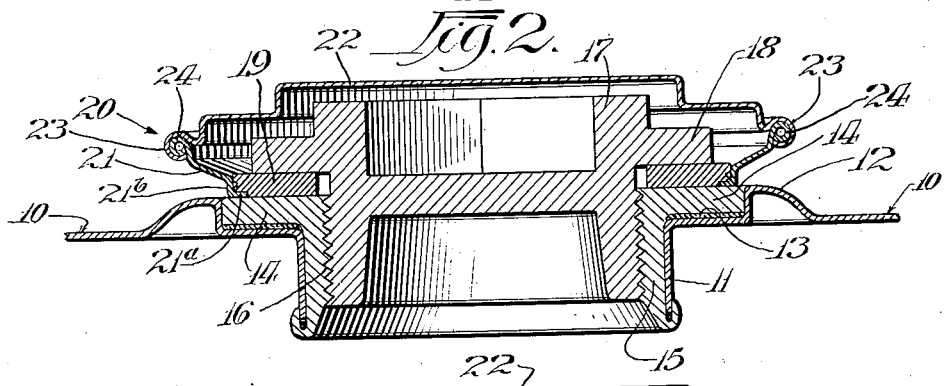
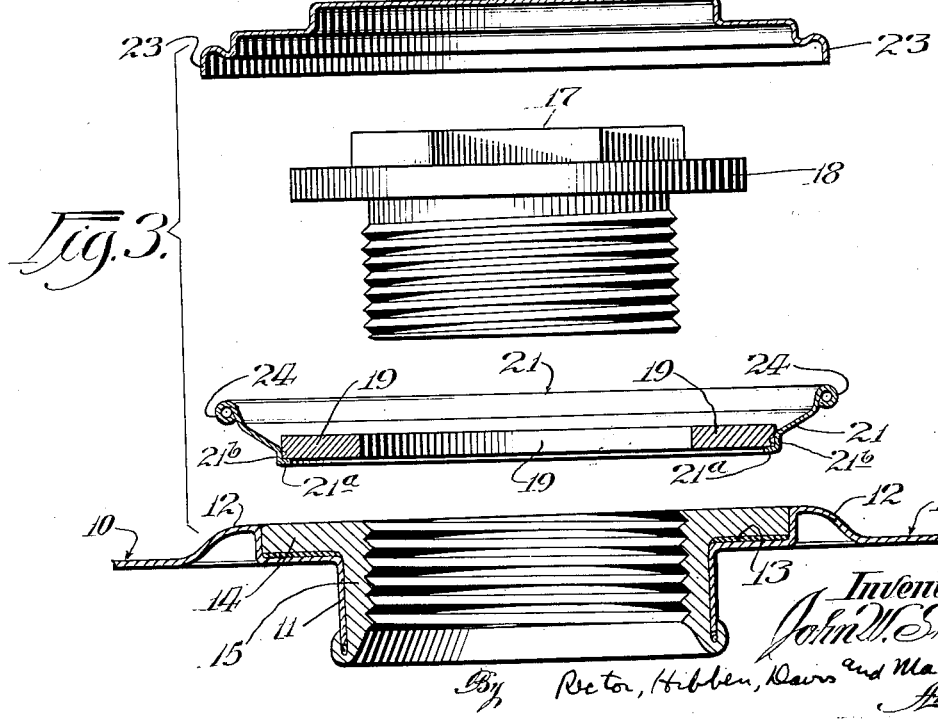
Inventor:
John W. Shera,
By Rector, Hibben, Davis and Macauley
Attorneys.

Patented Mar. 6, 1934

1,949,979

UNITED STATES PATENT OFFICE 1,949,979

CONTAINER AND SEALING MEANS THEREFOR

John W. Shera, Chicago, Ill., assignor to American Flange & Manufacturing Company, Chicago, Ill., a corporation of Illinois Application August 10, 1931, Serial No. 556,189

3 Claims. (Cl. 220—39)

This invention relates to containers of that class which are provided with bungs in the form of threaded plugs which are adapted to be screwed into interiorly-threaded bushings that are suitably assembled in the wall portions of the containers, the invention having utility particularly in connection with drums or barrels in which gasoline, oil or the like liquid is packaged for treatment.

My invention is well adapted to structure of the foregoing character wherein the plug and bushing are provided with laterally-projecting, overlapping flanges between which a sealing gasket may may be interposed for effecting a seal when the plug is screwed into place. In such structures, it has heretofore, been customary in guarding against unauthorized access and removal of the plug to employ sealing means taking the form of a hood covering and concealing the otherwise exposed part of the plug. In applying the sealing hood, it has also been customary to give it such shape that a part of the same is projected between the plug flange and the sealing gasket or between the bushing flange and the sealing gasket which arrangement has, at times, been found to be unsatisfactory due to leakage caused by interposing metal between the seal surfaces. The principal object of my invention is to eliminate the foregoing objectionable condition and to provide an improved means for preventing undetectable access to and removal of the plugs wherein the sealing surfaces between the plug flange, the bushing flange and the sealing gasket are unobstructed leaving the plug and bushing free to contact the sealing gasket without any intervening thickness of metal.

A further object is to provide an improved arrangement of the foregoing character wherein the sealing gasket is secured to and forms a part of the sealing means wherefore shipping, handling and installation of the closure and seal parts are greatly facilitated. In carrying out my invention the seal device is preferably formed of thin metallic material and a part thereof is struck into the periphery of the sealing gasket whereby the gasket is firmly secured to and becomes a part of the seal device.

Other objects and advantages will become apparent as this description progresses and by reference to the drawing, wherein:

Figure 1 is a top plan view of one form of structure embodying my invention, certain of the parts thereof being broken away to facilitate illustration;

Fig. 2 is an enlarged section taken substantially on line 2—2 of Fig. 1; and

Fig. 3 is a view showing parts that appear in Fig. 2 in separated relation, with certain of the parts thereof being shown in section.

In the drawing, the container wall 10 is provided with a depending annular flange 11 struck therefrom to provide a circular opening therein. The container wall adjacent the flange 11 is provided with an upstanding annular boss 12 providing an annular pocket 13 surrounding the opening defined by flange 11 which pocket receives the horizontally-projecting flange 14 of an interiorly threaded bushing 15 which extends down through and fits snugly within the flange 11. The lower end of the bushing 15 is reduced in thickness and is turned over and inwardly upon the adjacent end of the flange 11 to securely fasten the bushing in place in the container wall. The bushing flange 14 and the pocket 13 may take any desired irregular shape to prevent rotation of the bushing.

The bushing opening 16 is normally closed by an exteriorly threaded plug 17 adapted to be screwed thereinto. This plug is provided with a horizontally-extending flange 18 which overlies a part of the bushing flange 14, and a seal gasket 19 is interposed between the plug and bushing flanges 18 and 14 to seal the closure when the plug 17 is screwed firmly into place. According to my invention, the gasket 19 is supported by and forms a part of the seal means, indicated generally at 20, which will now be described.

During transportation and storage of the filled container, it is desirable that some form of seal means be provided to prevent undetectable access to and removal of the plug 17. In the illustrated form of my invention, this means takes the form of a hood structure which comprises a cylindrical, cup-shaped member 21 formed of a thin, metallic material. The side wall of this member 21 tapers downwardly and inwardly in a step-like formation and its bottom edge is turned slightly inward as at 21ª providing a bottom opening therein which is of a diameter substantially the same as, but not less than, the outside diameter of the plug flange 18. The seal gasket 19, which has a comparatively stiff body, is seated upon this narrow inturned edge 21ª with its periphery snugly seated against the adjacent cylindrical part 21ᵇ of the member 21. To firmly secure the gasket to the member 21, the metal of the cylindrical part 21ᵇ is upset or perforated at a plurality of points around the outer periphery of the gasket 19 by a suitable die which forces the upset or perforated metal into the periphery of the gasket as clearly shown in Figs. 2 and 3.

When it is desired to close and seal the container, the sealing member 21 is placed upon the bushing flange 14 with its opening axially aligned with the bushing opening 16, and the plug 17 is then screwed firmly into place (Fig. 2), confining the hood member inturned edge 21a between outer edge of the gasket and the bushing flange 14. Since the external diameter of the plug flange 18 is not such as to overlap the inturned flange part 21a of the seal member 21, the seal surfaces between the gasket 19 and the plug and bushing flanges 18 and 14 are unobstructed and free from any intervening thickness of metal which might tend to disturb the leak-proof nature of the seal, and the sealing pressure applied by the plug flange 18 is directly against and with respect to such unobstructed sealing surfaces.

The seal is completed by a cap member 22 which has its rim 23 turned over upon and interlocked with the rim 24 of the member 21 by any suitable form of tool after the plug 17 and member 21 have been assembled in the position above described. With the parts assembled as above described, access cannot be had to the plug 17 without ready detection of the same. Further, with the foregoing arrangement, after the filled and sealed container has reached its destination and the seal is broken, the gasket 19 may be detached from the member 21 and employed for seal purposes in the ordinary and further use of the container.

From the foregoing, it will be obvious that my invention is well adapted to the accomplishment of the objects hereinabove set forth; and it will be understood that, while I have shown only one form of my invention, other changes in details and arrangement of parts may be made without departing from the spirit and scope of my invention as defined by the claims which follow.

I claim:

1. The combination with a container having an opening through the wall thereof; of a bushing mounted in said opening and having a flange seated upon the container wall around said opening; a closure plug adapted to be inserted in the opening of said bushing and having a flange overlapping said bushing flange; and seal means preventing access to said plug which includes a member having an open-bottom cylindrical part the lower edge of which is turned inwardly to a slight extent, an annular seal gasket of greater outside diameter than said plug flange seated upon said inturned part and having its periphery secured to said cylindrical part, said gasket having an opening adapted to align with said bushing opening to receive said plug with part of said gasket interposed between said plug and bushing flanges, the diameter of said plug flange being not greater than the diameter of the opening defined by said inturned part leaving the seal surfaces directly between said gasket and plug flange and said gasket and bushing flange free of metallic obstruction.

2. In structure of the class described, means forming an opening in the wall of the container, a closure plug adapted to be mounted in said opening and having a laterally-projecting flange overlying the surface surrounding said opening, and sealing means rendering said plug normally inaccessible comprising a hood device having a cylindrical open-bottom body part, a ring-shaped gasket having its outer periphery secured to said cylindrical open-bottom body part and adapted to extend between said plug flange and the surface around said opening which said plug flange overlies, the lower edge of said cylindrical body part immediately beneath said gasket being slightly inturned and said gasket having substantial stiffness to secure said hood device in place, and the lateral spread of said plug flange being not greater than the diameter of the opening defined by said inturned portion of the cylindrical part of said hood device so that when said plug is screwed into said opening its flange will press said gasket into sealing relationship with adjacent parts with the seal points free of intervening metallic surfaces.

3. In structure of the class described, means forming an opening in the container wall with a seal seat therearound, a plug screwed into said opening and having a lateral flange aligned with said seal seat, a pair of superimposed, thin metallic members which when joined together provide a hood structure for preventing undetectable access to said plug, the lower of said members having an open-bottom cylindrical part, an annular gasket supported within said cylindrical part and disposed between said plug flange and seal seat, said gasket having a greater diameter than said plug flange so that its peripheral edge projects laterally therefrom, the lower edge of said cylindrical bottom part being inturned slightly beneath the bottom of said gasket but not to such an extent as to be disposed between said plug flange and seal seat, and said cylindrical part having a portion thereof struck inwardly at intervals into the periphery of said gasket for securing the latter to said lower member.

JOHN W. SHERA.